United States Patent Office 3,832,378
Patented Aug. 27, 1974

---

3,832,378
α-(CHLOROTHIO)ISOBUTYRONITRILE, α - (CHLORODITHIO)ISOBUTYRONITRILE AND THEIR PREPARATION; AND PREPARATION OF α,α'-DITHIOBISISOBUTYRONITRILE
Howard A. Hageman, Southbury, Conn., assignor to Uniroyal, Inc., New York, N.Y.
No Drawing. Filed Mar. 6, 1972, Ser. No. 232,252
Int. Cl. C07c 121/02, 121/16, 121/20
U.S. Cl. 260—465.1                 9 Claims

ABSTRACT OF THE DISCLOSURE

The invention relates to the synthesis of novel derivatives of isobutyronitrile. The compounds derived from this synthesis are α-(chlorothio)isobutyronitrile and α-(chlorodithio)isobutyronitrile. The invention also relates to a novel method for preparing α,α'-dithiobisisobutyronitrile.

BACKGROUND OF THE INVENTION

The majority of sulfenyl chlorides and dithiochlorides are highly reactive compounds which are characterized by limited stability. Because of this limited stability, these reactive compounds must be prepared just prior to use and kept at low temperatures up to the time of actual usage.

A few of these reactive compounds, e.g., trichloromethane sulfenyl chloride, trifluoromethane sulfenyl chloride and the nitro and dinitrobenzene sulfenyl chlorides, do not require storage at low temperatures. They are stable in storage and can be purified by high temperature operations, such as, by distillation or recrystallization.

The novel compounds of the present invention, namely α-(chlorothio)isobutyronitrile, and α-(chlorodithio)isobutyronitrile, may be grouped with the stable sulfenyl chlorides and dithiochlorides because they can be purified by distillation under reduced pressure and stored (in the absence of moisture) at room temperature for several months without significant decomposition. The greater stability and lower reactivity of the compounds of this invention may result from the electrophilic cyano group joined to the carbon atom bearing the —SCl and —SSCl moieties. While the chemical reactivity of the novel compounds is less than that of many common alkyl and aryl sulfenyl chlorides and dithiochlorides, it is sufficient for a variety of useful reactions characteristic of this general class of chemicals. The α-(chlorothio)isobutyronitrile and α-(chlorodithio)isobutyronitrile may also be employed as miticides.

Extending the reaction time of the process employed to synthesize the α-(chlorodithio)isobutyronitrile produces substantial yields of α,α'-dithiobisisobutyronitrile. The increased yield of this process constitutes an improvement over art known processes for making the latter compound.

DETAILED DESCRIPTION OF THE INVENTION

A first embodiment of the invention is the synthesis of two novel derivatives of isobutyronitrile. These two derivatives are α-(chlorothio)isobutyronitrile (I) and α-(chlorodithio)isobutyronitrile (II).

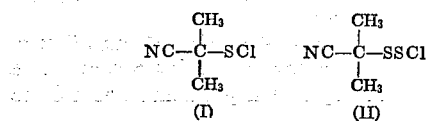

These compounds are produced by reacting isobutyronitrile with sulfur monochloride. In general, the course of this reaction proceeds as follows:

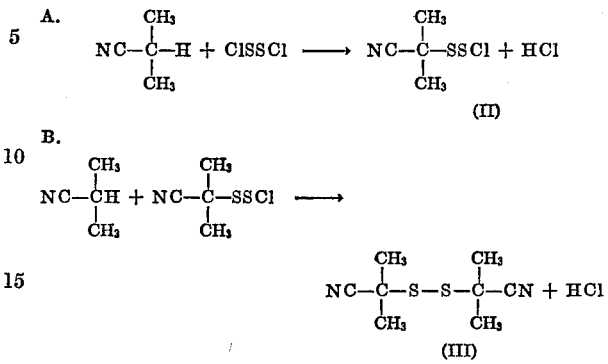

Good yields of α-(chlorodithio)isobutyronitrile (II) may be isolated by using short reaction periods and by reacting a mole of isobutyronitrile with a molar equivalent of sulfur monochloride. This is so because the rate of reaction B, to form α,α'-dithiobisisobutyronitrile (III), is considerably slower than reaction A. When two or more molar equivalents of isobutyronitrile are reacted with one equivalent of sulfur monochloride, and the reaction time is extended, the major product formed is α,α'-dithiobisisobutyronitrile (III).

Thus, when sulfur monochloride is added to two or more molar equivalents of isobutyronitrile and the resulting mixture allowed to stand at room temperature, no appreciable reaction will occur during the first 12 to 18 hours. Thereafter, hydrogen chloride begins to evolve and continues at a moderate rate for the next 10 to 20 hours. At this stage, the reaction mixture contains a large amount of II but only small amounts of III. After a reaction time of 3 to 5 days the mixture will consist largely of the disulfide (III) and a small amount of the α-(chlorodithio)-isobutyronitrile (II). This behavior is quite different from the manner in which isobutyraldehyde reacts with sulfur monochloride to give a 77% yield of α,α'-dithiobisisobutyraldehyde in 18 hours as disclosed in U.S. 2,580,695. In the process of this patent, isobutyraldehyde reacts so rapidly with sulfur monochloride that isolation of the intermediate dithiochloride is not possible.

Although little or no reaction occurs between mixtures of isobutyronitrile and sulfur monochloride during the first 6 to 8 hours, this condition may be altered by saturating the mixture with anhydrous hydrogen chloride. This saturation results in a 10–15° C. rise in temperature and within 30 to 60 minutes hydrogen chloride rapidly evolves for a period of 7 to 10 hours. At this stage the formation of α-(chlorodithio) isobutyronitrile (II) is essentially complete and only a small amount of α,α'-dithiobisisobutyronitrile (III) is present. Saturating the mixture with anhydrous hydrogen chloride is the most preferred method for obtaining compound II. Generally, the amount of anhydrous hydrogen chloride per total weight of reactants may range from 0.5% to 5.0%; preferably from 1% to 2.0%.

When preparing compound (II) without the catalyzing assistance of the anhydrous HCl, the broad reaction time may range from about 8 to 30 hours; however, the preferred reaction time utilizing anhydrous HCl will range from about 10 to 15 hours. Reaction temperatures in which the synthesis of the invention are performed may range from 10° C. to 100° C., however, the preferred range will be from about 30° C. to 60° C.

Although the reaction between isobutyronitrile and sulfur monochloride to form α-(chlorodithio)isobutyronitrile (II) may be catalyzed effectively by anhydrous hydrogen chloride, no effective means have been found to accelerate the further reaction of α-(chlorodithio)isobutyronitrile with isobutyronitrile to form α,α'-dithiobisisobutyronitrile (III). Thus, the broad reaction time in preparing compound (III) will range from 2 to 10 days; preferably, from 3 to 5 days. However, this notwithstanding, the process of this invention is far superior to the synthesis reported by D. I. Relyea, in U.S. 3,133,955, which involves the thermal decomposition of α,α'-azobisisobutyronitrile in the presence of sulfur. The process of this patent employs as the starting material, azobisisobutyronitrile, which is expensive. After a rather protracted work-up of the reaction mixture, Relyea isolates the desired α,α'-dithiobisisobutyronitrile in a yield of 8.3%. However, the major product formed is the highly toxic tetramethyl succinonitrile.

The preferred method of synthesizing α-(chlorothio)isobutyronitrile (I) is by reacting the disulfide (III) with chlorine or sulfuryl chloride. The synthesis may also be performed by chlorinating (II) as shown by the following equation:

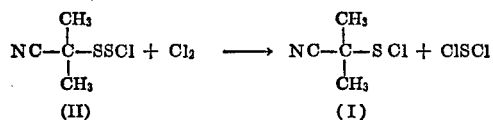

The invention will now be described by reference to specific examples:

Example I

The α-(chlorodithio)isobutyronitrile is prepared as follows:

Approximately 1350 g. (10.0 moles) of sulfur monochloride is added to 759 g. (11.0) moles of isobutyronitrile. Anhydrous hydrogen chloride is passed into this mixture until 40 g. is absorbed. This caused the temperature of the mixture to rise from 25° C. to 38° C. Within 1 hour, hydrogen chloride is evolved at a rapid rate. After standing for a total of 20 hours very little further evolution of hydrogen chloride is apparent. The reaction mixture is then heated under aspirator vacuum to remove hydrogen chloride and isobutyronitrile. Upon vacuum distillation of the residual red-orange liquid, approximately 1431 g. (85% yield) of α-chlorodithio isobutyronitrile is collected as an orange colored liquid of boiling point range 60–65°/0.5 mm. As a residue, there is obtained 183 g. of a brown liquid which solidified on cooling. This residue consists mainly of α,α'-dithiobisisobutyronitrile.

A sample of the α-(chlorodithio)-isobutyronitrile is then carefully redistilled. This sample had the following properties:

b.p=50°/0.5 mm.
$n_D^{25°}=1.5445$
$d_4^{.25°}=1.2506$

Calculated for $C_4H_6ClNS_2$: C=28.66%; H=3.58%; Cl=21.19%; N=8.36%; S=38.30%. Found: C=28.83%; H=3.68%; Cl=21.25%; N=8.47%; S=38.35%.

Example II

The preparation of α,α'-dithiobisisobutyrontrile is as follows:

Anhydrous hydrogen chloride is passed into a mixture of 1725 g. (25.0 moles) of isobutyronitrile and 1350 g. (10.0 moles) of sulfur monochloride until the mixture was saturated. This caused the temperature of the mixture to rise from 23° C. to 35° C. The reaction flask is equipped with a condenser from which a tube is run to a cold water scrubber to absorb the gaseous hydrogen chloride. Over a period of 40 minutes the rate of evolution of hydrogen chloride became rapid as the temperature of the mixture reached a maximum of 43° C. After 5 to 6 hours, the rate of evolution of hydrogen chloride diminished rapidly. The mixture is allowed to stand at ambient temperatures for four days as hydrogen chloride continued to be evolved at a slow rate. The reaction mixture is then subjected to aspirator vacuum to remove the dissolved hydrogen chloride. Heating the mixture under a vacuum of 25 mm. to an ultimate temperature of 90° C. enable collection of 390 g. of distillate consisting mainly of recovered isobutyronitrile. The residue amounted to 1980 g. of crude α,α'-dithiobisisobutyronitrile consisting of a pale amber liquid, which crystallized on cooling to room temperature.

By twice recrystallizing a sample of this crude product from methanol, pure α,α'-dithiobisisobutyronitrile is obtained as colorless crystals of melting point range 61–63° C.

The chlorination of this purified α,α'-dithiobisisobutyronitrile provides an excellent synthesis of α-(chlorothio) isobutyronitrile (I) as shown in the example next.

Example III

Preparation of the α-(chlorothio)isobutyronitrile is as follows:

A. From pure α,α'-dithiobisisobutyronitrile. Chlorine gas is passed into a solution of 200 g. (1.0 mole) of α,α'-dithiobisisobutyronitrile (m.p. 61–63°) in 250 ml. of benzene, while vigorously stirring the solution. Occasional cooling is employed to prevent the temperature of the reaction mixture from exceeding 35° C. Over 30 to 40 minutes a total of 71 g. (1.0 mole) of chlorine is introduced. After standing for 1 hour, the benzene is removed in a rotary vacuum still. Distillation of the residual liquid gave 248 g. (92% yield) of α-(chlorothio)isobutyronitrile in the form of a deep yellow liquid, having a boiling point range of between 35–40° C./0.5 mm.

Upon careful redistillation, the compound had the following properties:

b.p.=29–30° C./0.4 mm.
$n_D^{25}=1.4792$
$d_4^{25}=1.1498$

Calculated for $C_4H_6ClNS$: S=23.62%; Cl=26.29%; N=10.33%. Found: S=23.21%; Cl=26.01%; N=10.01%.

B. From crude α,α'-dithiobisisobutyronitrile. A solution of 400 g. (2.0 moles) of the crude α,α'-dithiobisisobutyronitrile (vide supra) in 200 g. of benzene is stirred in an ice bath as 143 g. of chlorine is introduced. During the introduction of the chlorine the temperature of the mixture is maintained in the range of 15–20° C.

After the benzene is removed under aspirator vacuum, the residue is distilled. Approximately 440 grams (81% yield) of α-(chlorothio)-isobutyronitrile having a boiling point range between 35–39°/0.5 mm. is obtained.

The two novel compounds of this invention may be employed as miticides as shown by their activity in a mite contact test.

Example IV

Same as Example III, except that sulfuryl chloride is employed in lieu of chlorine.

Example V

In this test the compounds are prepared as hexane solutions containing 1000 p.p.m. of the active compound. Cotton plants in the primary leaf stage are grown on a heated bench in a greenhouse at 70° F. One plant is used in each pot for one replicate. Two replicates are used for each compound tested. Adult mites of the species *Tetranychus urticaw* are transferred to the test plants 48 hours prior to spraying. A 1-inch diameter circle of tanglefoot is used to confine the mites to the upper leaf surfaces. Within each circle of tranglefoot are placed 10 mites. Two check plants are included in the test so as to measure the natural mortality of the adult mites.

The plants are sprayed to the point of run-off with hexane solutions of the compounds, using a concentrate sprayer at 20 p.s.i. The sprayer is positioned about 6" to 12" from the plant and angled to spray slightly downward so as to thoroughly wet the upper leaf surfaces of the plants.

Initial counts of the mites present are made shortly after spraying. The plants are held five days in the greenhouse at an approximate temperature of 75° F. After this period a final count is made of the live adult mites remaining on the leaves.

Abbott's formula is used to compensate for check mortality. The adjusted percent control is obtained as follows:

Adjusted percent control $$= \frac{\text{Percent live mites on check plants} - \text{Percent live mites on treated plants}}{\text{Percent live mites on check plants}} \times 100$$

The concentration levels (expressed in parts per million) at which a chemical gives 95% control of the mites is expressed as the $LD_{95}$. The two compounds of the invention gave $LD_{95}$ values as follows:

α-(chlorothio)isobutyronitrile, $LD_{95}$/1000 p.p.m.
α-(chlorodithio)isobutyronitrile, 900 p.p.m.

The data shows that miticidal activity is demonstrated for these two novel compounds.

While the invention has been described by reference to specific operative embodiments it is to be understood by the practitioner in the art that the invention may be subjected to various modifications without departure from the spirit and scope of the inventive ambit.

What is claimed is:
1. α-(chlorodithio)isobutyronitrile.
2. α-(chlorothio)isobutyronitrile.
3. A process for preparing α-(chlorodithio)isobutyronitrile comprising reacting 1.0 to 1.1 mole of isobutyronitrile with a mole of sulfur monochloride for a period of from 8 to 30 hours at a temperature of from 10° to 100° C.
4. The process of claim 3, wherein the reaction is conducted in contact with about 0.5% to 5% by weight of anhydrous hydrogen chloride based on the total weight of reactants.
5. The process of claim 3, wherein the reaction is conducted in contact with 1.0% to 2.0% by weight of anhyrous hydrogen chloride based on the total weight of reactants.
6. A process for preparing α-(chlorothio)isobutyronitrile comprising reacting α,α'-dithiobisisobutyronitrile in a benzene solution with a molar equivalent of chlorine at a temperature of from 15° to 35° C.
7. A process for preparing α,α'-dithiobisisobutyronitrile comprising reacting at least 2 molar equivalents of isobutyronitrile with a molar equivalent of sulfur monochloride for from 2 to 10 days.
8. The process of claim 7, wherein the reaction is conducted in contact with about 0.5% to 5.0% by weight of anhydrous hydrogen chloride based on the total weight of reactants.
9. The process of claim 7, wherein the reaction is conducted in contact with 1.0% to 2.0% by weight of anhydrous hydrogen chloride based on the total weight of reactants.

References Cited
UNITED STATES PATENTS
3,133,955   5/1964   Relyea _____ 260—465.8 R JOSEPH P. BRUST, Primary Examiner U.S. Cl. X.R.
260—465.8 R; 424—304